US012332751B1

(12) United States Patent
Morton et al.

(10) Patent No.: US 12,332,751 B1
(45) Date of Patent: Jun. 17, 2025

(54) IDENTIFYING KEYWORDS FOR INDEXING CONTENT AND SEARCHING BACKUPS

(71) Applicant: Dell Products L.P., Round Rock, TX (US)

(72) Inventors: James Morton, Adamstown, MD (US); Sybil Guan, Shanghai (CN); Zak Yujun Liang, Shanghai (CN); Xiang Zhang, Shanghai (CN); Tony Yao, Shanghai (CN); Lihui Su, Shanghai (CN); Roger Che, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/762,858

(22) Filed: Jul. 3, 2024

(51) Int. Cl.
  *G06F 11/10* (2006.01)
  *G06F 11/14* (2006.01)

(52) U.S. Cl.
  CPC ...... *G06F 11/1469* (2013.01); *G06F 2201/84* (2013.01)

(58) Field of Classification Search
  None
  See application file for complete search history.

(56) References Cited

U.S. PATENT DOCUMENTS

| 7,181,438 B1* | 2/2007 | Szabo | G06F 16/248 705/14.27 |
| 11,741,145 B1* | 8/2023 | Pandit | G06F 11/1451 707/738 |
| 2021/0182328 A1* | 6/2021 | Rollings | G06F 40/30 |
| 2022/0012268 A1* | 1/2022 | Ghoshal | G06F 16/906 |

* cited by examiner

*Primary Examiner* — Jau Shya Meng
(74) *Attorney, Agent, or Firm* — Dergosits & Noah LLP; Todd A. Noah

(57) ABSTRACT

A system identifies a list of frequently identified keywords, which are identified based on frequencies that each frequently identified keyword is in any backup document and frequencies that any backup document contains each frequently identified keyword. The system identifies a list of locally searched keywords, which a data protection system used for searching local backups. A machine learning model creates a ranked list of globally searched keywords, which multiple data protection systems used for searching global backups, wherein each globally searched keyword is weighted based on use in global searches that resulted in any keyword match and/or any backup restore. The system identifies terms from backups which match keywords from the frequently identified keywords, the locally searched keywords, and/or the globally searched keywords. The system enables content searches, based on indexing the matched terms, of the backups.

20 Claims, 8 Drawing Sheets

*— 200*

Project Business Plan.pptx

C:\TestFiles
Source: nve Client: s1-poc-client-1.poc-domain.local
Size: 207.6 KB Last Modified: Apr 24, 2014 5:10:33 PM
Platform; networker Plugin: Windows *— 202*
Backup Target: C:\
BUSINESS PLAN MyCorp Business plan Project will revolutionize the world. Background information Summary Company Description Product / Service The market Strategy and Implementation Management Team Financial Analysis BUSINESS PLAN Content
Specific Metadata: metadata_resourcename: Project Business Plan.pptx
Detail Preview Restore

FIG. 2

IDENTIFYING KEYWORDS FOR INDEXING CONTENT AND SEARCHING BACKUPS

BACKGROUND

A data object may be a set of information that is backed up as a unit. If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of the data object and the embedding of these values in a database's data structures) within dedicated files which are referred to as backups. When the data protection administrator decides to reinstate the data object to a previous state, the data protection administrator specifies the desired previous state by identifying a desired time when the data object was in this previous state, and then instructs the backup/restore application to execute a restore operation to restore a copy of the corresponding backup(s) for that previous state to the data object.

A data user may copy a data object in a data center to one or more remote sites, which may be in one or more cloud locations, to have copies of the data object in case of a data center disaster, and/or the data user may copy data objects from remote sites to a centralized data center. Data storage systems include recording media that retain digital information such as data objects, have evolved towards scalable designs that can grow with customer demand by adding storage and computation as necessary, and typically store redundant information. For example, when creating a copy of an enterprise's email system data which includes 100 instances of the same 1 Megabyte (MB) data file attachment, a data storage system may store all 100 instances of the same 1 MB data file attachment, inefficiently using 100 MB of storage space to store the same 1 MB data file attachment. Data deduplication can eliminate redundant copies of information, which can improve the utilization of data storage systems and lower capital expenditure by reducing the total amount of recording media required to meet the capacity needs of data storage systems. Continuing the previous example, a data deduplication system stores only one instance of the same 1 MB data file attachment and stores small references to the one stored instance for the 99 subsequent instances.

A data protection platform may be composed of components which enable a data user to create backups that include copies of data objects, deduplicate the copies of the data objects, and store the deduplicated copies of data objects efficiently in high availability clusters of data storage systems. It is common for data protection software and appliances to support granular level recovery of individual items within backups, such as files, emails, and database rows. Since there might be a very large number of these items, such as hundreds of millions, or even billions, distributed over all backups of all assets, identifying the specific asset and specific backup that contains a specific item could be a challenge for data users.

To help with this challenge, data protection software may support content indexing of items inside backups, enabling a user search feature to identify items and the backup in which the items are copied so that granular recovery can then be performed. A basic user search is based on metadata, such as the name, size, date, and folder. A keyword search is much more powerful and useful, allowing items to be identified using strings and regular expressions that match the content inside the items. However, full text indexes consume a huge amount of disk space, which can make using full text searches resource-prohibitive.

Products such as Dell's PowerProtect Data Manager and DM5500 index the metadata of items inside backups, with a focus on files. FIG. 1 is a block diagram illustrating that the individual fields indexed can include metadata on the file itself, such as filename 102, path, size 104, create date 106, modified date 108, and attributes 110; and also data protection metadata, such as the policy, asset, and range of backups in which the file is copied. This indexing enables basic searches on those fields.

However, indexed file metadata does not enable searches for keywords inside a file, which may become critical when attempting to identify terms in a specific version of the file. Consider the scenario where a "Business Plan" document has been backed up over a period of 90 days, and a critical section was accidentally removed at some point during that period. The removed section could be found in some of the 90 backups which include that document, but with no way to determine the correct backup file, the search requires a trial-and-error process to restore the missing section of the document. On the other hand, if full content indexing is supported, a user can enter a known term or terms, such as "Business Plan," as the basis for a search, as depicted by FIG. 2, which enables the file or the subset 202 of files that contain the term "Business Plan" to be identified, and recovered from the specific backup(s) in which the section is copied. Thus, indexing the full content of files and other items in backups is often a desirable feature and a product differentiator, but the cost in storage space makes full content indexing prohibitive for many users.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

FIG. 2 is a block diagram illustrating an example term entered to search for backups.

DETAILED DESCRIPTION

Figure 1:
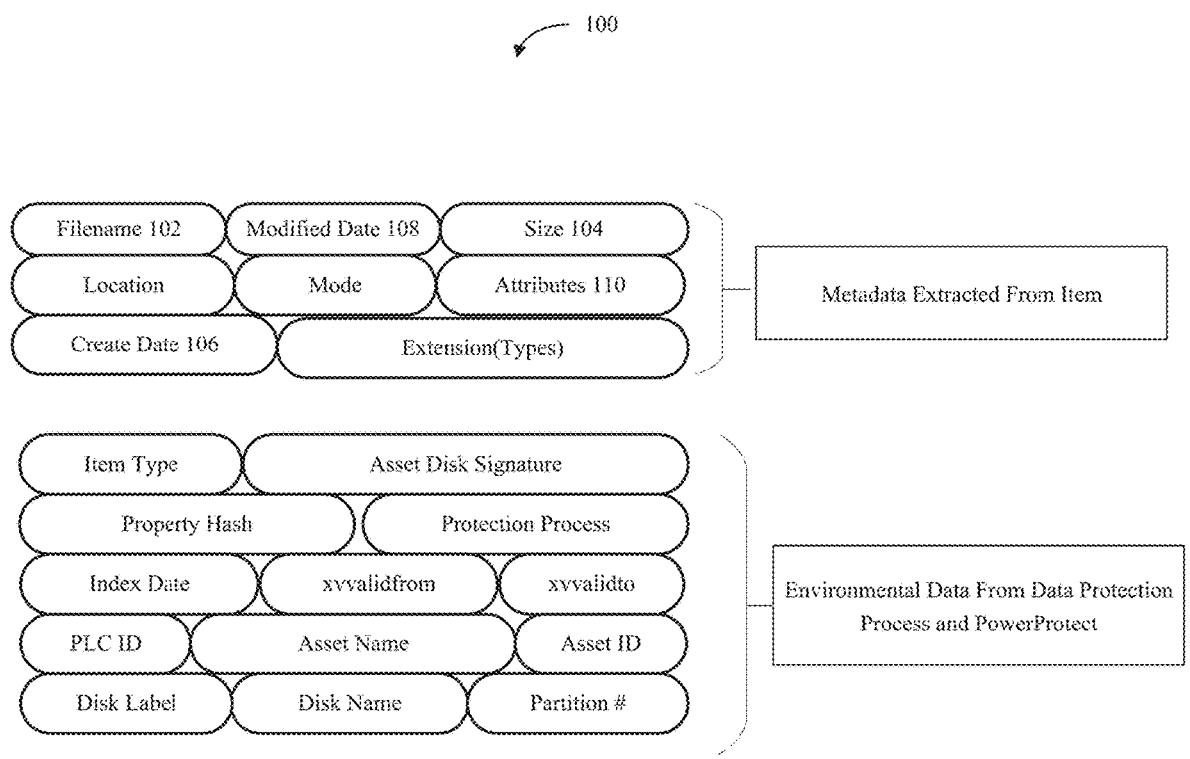
FIG. 1 is a block diagram illustrating example metadata and environmental data which is indexed to enable searches of backups.
Figure 3:
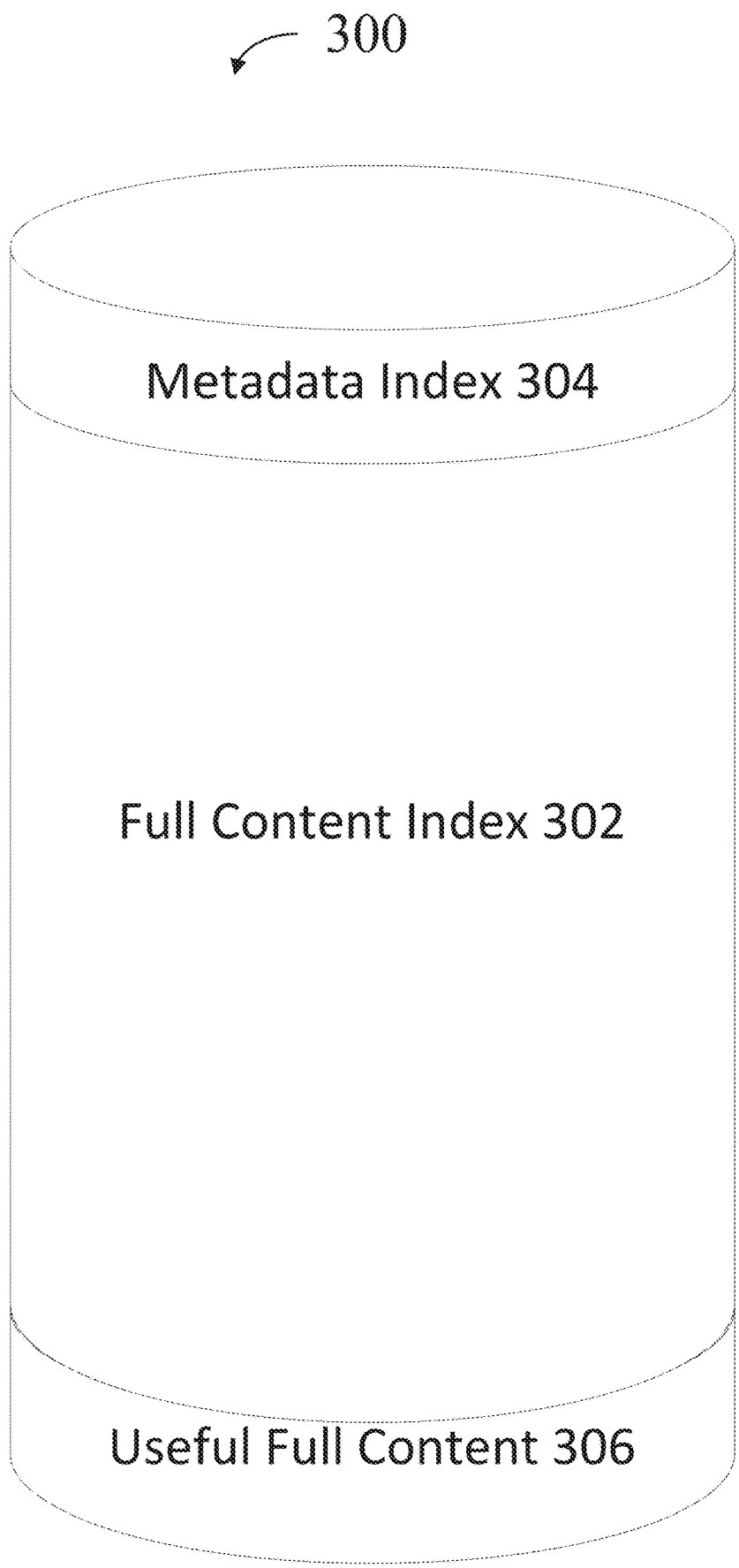
FIG. 3 is a block diagram illustrating an example storage device comparison between storage of optimal and non-optimal terms.

The "scraping" of terms, text, or keywords from a wide variety of document types may be achieved with open-source tools such as Apache Tika. Heap's Law states that the subset of unique keywords in a document scales by document size. As depicted by FIG. 3, internal testing at Dell has demonstrated that full content indexes 302 consume anywhere from 10 times to 40 times the storage space required for metadata-only indexes 304. For a typical customer with billions of items inside their backups, that can mean tens of terabytes of wasted storage because most of the keywords in full content indexes are never used for searches. If, for example, only 1% of the indexed keywords are every likely to be useful full content 306 for searching keywords in backups, the size of the indexes can theoretically be reduced by 99%.

Such smaller indexes would also greatly improve search time and central processing unit (CPU)/memory usage. There are two approaches currently used to avoid the large storage costs of full content indexes. The first is to not support full content indexing and searches at all, which is an approach used by Dell products such as PowerProtect Data Manager and DM5500. While this approach avoids the high storage costs, it also prevents users from reaping the benefits of keyword searches.

Figure 4:
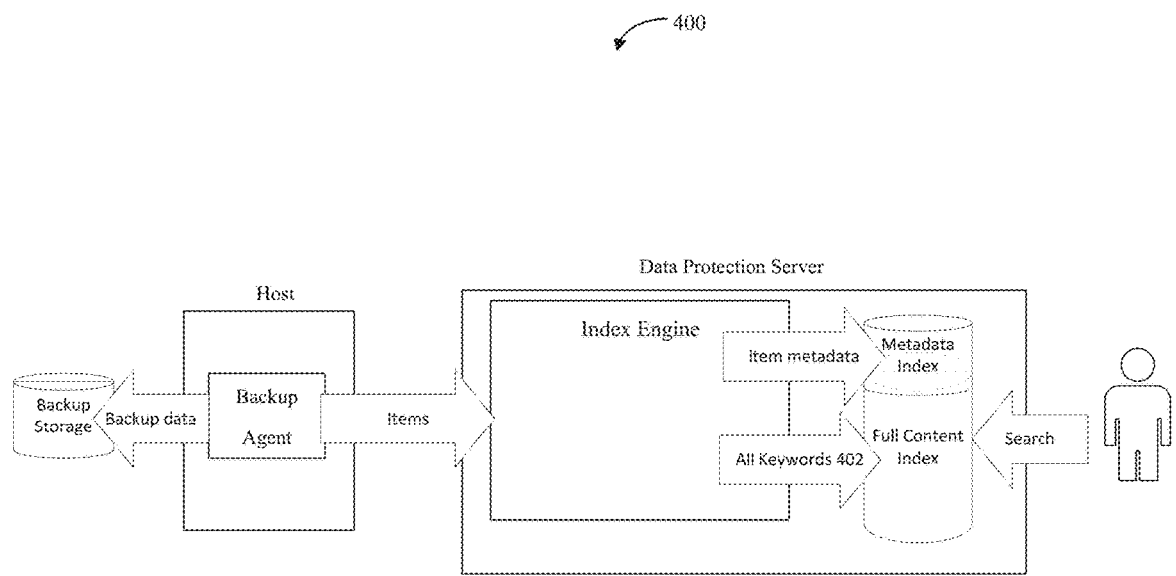
FIG. 4 is a block diagram illustrating an example store and search approach based on indexing all keywords.

The second approach 400 is to support full content indexing and searches, as depicted by FIG. 4, with all keywords 402 being stored into the index. Dell's Data Protection Search for Avamar and Networker supports this approach, but the high storage demands limits adoption and creates prohibitively high storage usage for some customers.

The solution is to strike a balance between the existing approaches by providing the benefits and efficiency of keyword searches without the penalty of large storage usage. This balanced solution is achieved by creating a list of "optimal" keywords and a list of the scraped or extracted terms from files and other items in the backups, and then storing only the listed terms extracted from the backups which match the listed optimal keywords which are stored in indexes for subsequent text searches. In this case, "optimal" keywords means keywords that are highly likely to be searched for by users and (where applicable) have resulted in keyword matches and/or backup restorations in the past.

In some embodiments, a system (and a computer program product and a method) is described for identifying keywords for indexing content and searching backups. A system identifies a list of frequently identified keywords, which are identified based on frequencies that each frequently identified keyword is in any backup document and frequencies that any backup document contains each frequently identified keyword. The system identifies a list of locally searched keywords, which a data protection system used for searching local backups. A machine learning model creates a ranked list of globally searched keywords, which multiple data protection systems used for searching global backups, wherein each globally searched keyword is weighted based on use in global searches that resulted in any keyword match and/or any backup restore. The system identifies terms from backups which match keywords from the frequently indexed keywords, the locally searched keywords, and/or the globally searched keywords, and then enables content searches, based on indexing the matched terms, of the backups.

For example, Acme Corporation's data protection appliance uses the term-frequency/inverse document frequency formula to identify a list of 100 keywords that were the top-ranked terms from previous backups. The appliance identifies a list of 10 locally searched keywords which the appliance used to search local backups. A machine-learning model creates a list of 300 globally searched keywords, which multiple appliances used for searching keywords in global backups and retrieving some of the global backups. The appliance identifies 2,000 unique words and 10,000 words in a Word document that is in a current backup, compares the 2,000 unique words against the list of 100 frequently identified keywords, the list of 10 locally searched keywords, and the list of 300 globally searched keywords to result in a match of 100 keywords, which the appliance indexes, which enables using these 100 keywords for subsequent searches of Acme's current and future backups.

Various embodiments and aspects of the disclosures are described with reference to details discussed below, and the accompanying drawings illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Although these embodiments are described in sufficient detail to enable one skilled in the art to practice the disclosed embodiments, it is understood that these examples are not limiting, such that other embodiments may be used, and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment may be included in at least one embodiment of the disclosure. The appearances of the phrase "embodiment" in various places in the specification do not necessarily all refer to the same embodiment.

Any of the client devices can take the form of software, physical machines, or virtual machines, or any combination thereof, though no particular device implementation or configuration is required for any embodiment. Similarly, data protection platform components such as databases, storage servers, storage volumes, storage disks, backup servers, restore servers, backup clients, and restore clients can likewise take the form of software, physical machines, or virtual machines, though no particular component implementation is required for any embodiment. Where virtual machines are employed, a hypervisor or other virtual machine monitor may be employed to create and control the virtual machines.

As used herein, the term "data" is intended to be broad in scope. Accordingly, data may include data objects (or objects), data file segments (or segments) such as may be produced by data stream segmentation processes, data chunks, data blocks, atomic data, emails, data files, contacts, directories, sub-directories, volumes, etc. In some embodiments, the terms "file," "data file," "object," and "data object" may be used interchangeably.

In addition, the term "backup" (or "data backups," "backed-up data," etc.) is intended to be construed broadly and includes, but is not limited to, partial backups, incremental backups, differential backups, full backups, clones, snapshots, any other type of copies of data, and any combination of the foregoing. Any of the foregoing may, or may not, be deduplicated. In addition, the storage of data can employ any suitable storage technique, infrastructure, hardware such as a solid-state drive, and/or a hard disk drive, or virtual storage systems provided by a cloud service provider.

The system can use a term-frequency inverse document frequency formula to filter the top ranked keywords, which may be done inside the software appliance itself. As granular indexing is carried out for backups, the keywords in the files/items inside each backup are analyzed based on the Term Frequency-Inverse Document Frequency (TF-IDF) formulae, with the top scored keywords added to a list of "top ranked" locally indexed keywords. The Term Frequency (TF) of a term or word is the number of instances that a term appears in a document compared to the total number of terms or words in the document.

$$\text{term-frequency} = \text{number of instances of a term in a document}/\text{number of terms in the document}$$

The Inverse Document Frequency (IDF) of a term reflects the proportion of documents in the corpus that contain the term. Words unique to a small percentage of documents, such as technical jargon terms, receive higher importance values than words that are common across all documents, such as "a", "the," and "and". The Inverse Document Frequency is based on the number of documents in a corpus relative to the number of documents in the corpus that contain the term.

$$\text{Inverse Document Frequency} = \log(\text{number of documents in corpus})/(\text{number of documents in corpus that contain the term}).$$

The Term Frequency-Inverse Document Frequency (TF-IDF) may be determined by multiplying the Term Frequency (TF) and the Inverse Document Frequency (IDF) scores.

$$TF\text{-}IDF = TF \times IDF$$

The list of "top ranked" indexed keywords is also returned filtered to the backend of the data protection platform via call-home telemetry payloads, where the backend can supplement Acme's frequently identified keywords with similar keywords from the clusters of similar keywords, and then return Acme's supplemented frequently identified keywords to Acme's appliance.

The list of locally searched keywords is based on the local user search history, which is also executed internally in the local data protection appliance. As individual users execute search queries, the keywords searched are added directly into the list of locally searched keywords. Critically, the success level of each search is also taken into consideration, with the following ranking (high to low):

The highest ranking is for a searched keyword that resulted in a match between the searched keyword and a keyword in at least one of the backups, at least one of which was restored. The next highest ranking is for a searched keyword that resulted in in a match between the searched keyword and a keyword in at least one of the backups, but none of the keyword matches resulted in any backup restores. This list of locally searched keywords is sent to the backend for the data protection platform via telemetry reports.

However, the locally maintained list of locally searched keywords and the list of locally searched keywords that is sent to the backend through the call-home telemetry can differ. Any data sent to the backend must be filtered to remove any sensitive or proprietary terms, such as the proprietary names of Acme's products and services and the personal names of Acme's employees. Only generic terms, such as "customer," "design," "sales," and "historical," are included in telemetry payloads, and once the backend receives the generic terms, these terms are anonymized before being passed to the machine-learning model. Being anonymized means removing any identification of the source of the locally searched keywords that are sent to the backend of the data protection platform, such that Acme's locally searched keywords that were sent to the backend do not identify Acme as their source.

However, the identification of the source of the locally searched keywords is retained elsewhere because after the backend has supplemented Acme's locally searched keywords with similar keywords from the clusters of similar keywords, the backend needs to return Acme's supplemented locally searched keywords to Acme's appliance. This is how the genericized and anonymized list of locally searched keywords differs from the list of locally searched keywords, which include all terms.

Figure 5:
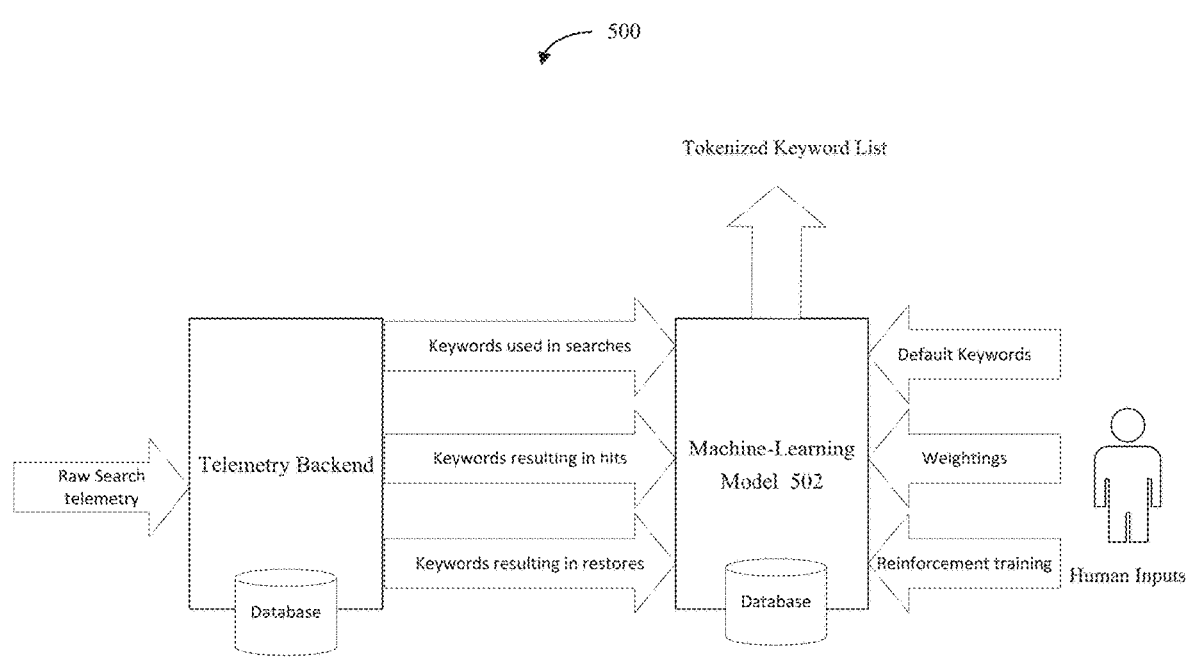
FIG. 5 is a block diagram illustrating an example operating environment for identifying keywords for indexing content and searching backups, according to one or more embodiments of the disclosure.

FIG. 5 depicts an example operating environment 500 in which the sanitized list of locally searched keywords are pushed to the backend in call-home telemetry payloads. This list of locally searched keywords is then extracted, anonymized, and combined with the lists of locally searched keywords received from many other customer's data protection systems, with these other lists of keywords having also been sanitized and anonymized. Then these multiple lists are pushed into a machine-learning model (or engine) 502, which processes all the data, assigning weightings based on a number of factors, such as search frequency, which is the total number of instances that a keyword is used in a search, search success, which is the percentage of instances that a searched keyword matches a keyword in a backup, and the percentage of instances that a matched keyword results in a granular level recovery. A machine-learning model is required to appropriately weigh each of the many factors for each of the many searches by each of the many data protection systems, which is a complicated process of balancing the needs of each customer against the relative importance of each keyword searched in the past to efficiently anticipate which keywords would be used by customers for future searches.

FIG. 5 also depicts that human inputs to the machine-learning model 502 can include default keywords, which are used for system initializations and other start-up situations when a system lacks any previous data. Therefore, the data protection appliance uses default settings based on standard keywords that most information retrieval systems have previously used, which enables a start-up system to begin indexing keywords prior to the start-up system's identification of its own keywords. Human inputs can also include weightings to assist in training the machine-learning model 502 and reinforcement training to correct any erroneous conclusions by the machine-learning model 502 during the training phase.

Weights used by the machine-learning model are also based on environmental considerations, such as the locale and/or the language, the document type, and the asset type. The environmental considerations identify not only the language in which the keywords are recorded, but also the locale, which could be helpful in differentiating between records written in American English from records written in British English. The document type specifies whether a document that could be searched is a word processing document, a power point presentation, a spreadsheet, or rows in a database. The asset type differentiates between a backup that includes rows of SQL database from a backup that includes a copy of a Kubernetes container.

Furthermore, the machine-learning model classifies keywords in groupings of similar terms. To train the machine-learning model, a language model, such as Bidirectional Encoder Representations (BERT), is combined with a K-means method. For example, the following clusters of related keywords may be identified by a cloud-based machine-learning model.

| Cluster 1 | Cluster 2 | Cluster 3 | ... | Cluster N |
|---|---|---|---|---|
| Ppdm, ddve, data protection | Support, marketing, sales, HR | 19.14, 19.15, 7.0, 0.0 | | |

If a search for "marketing" is carried out for a particular data protection appliance, this can indicate that keywords in Cluster 2 may be applicable for that appliance's searches, and therefore all keywords in that cluster should be indexed going forward.

The machine-learning model crunches the data, and outputs two lists, a ranked list of global searched keywords, and an appliance-specific list of supplemented locally searched keywords. For example, the ranked list of globally searched keywords includes the top 1% to 5% of keywords searched for across all data protection servers, adjusted for success rate, which may be supplemented by these keywords' similar keywords, which are identified from the clusters of similar keywords. An appliance-specific list of locally searched keywords is based on the history of the locally searched keywords for that appliance, which may also be supplemented by these keywords' similar keywords, which are also identified from the clusters of similar keywords.

The number of keywords in a ranked list of globally searched keywords may be tweaked by a backend administrator to produce an optimal ratio of index size relative to search success. For example, Acme's appliance is currently indexing only 20 keywords per new document that is being backed up, this may represent only 1% of the potential keywords being indexed, and Acme lacks a sufficient number of available keywords for many of their searches to result in matches, and has therefore budgeted to spend more resources on storage for the trade-off of more successful searches. In this situation, either the system administrator or the machine-learning model can double the number of keywords being indexed for each new document from 20 to 40, which represents an increase from 1% to 2% of the potential keywords being indexed. Conversely, if Acme is currently indexing 100 keywords per new document, which cumulatively consumes an amount of storage space that Acme has determined to be prohibitive, either the system administrator or the machine-learning model can reduce the number of keywords being indexed for each new document from 100 to 60, which represents a decrease from 5% to 3% of the potential keywords being indexed.

Figure 6:
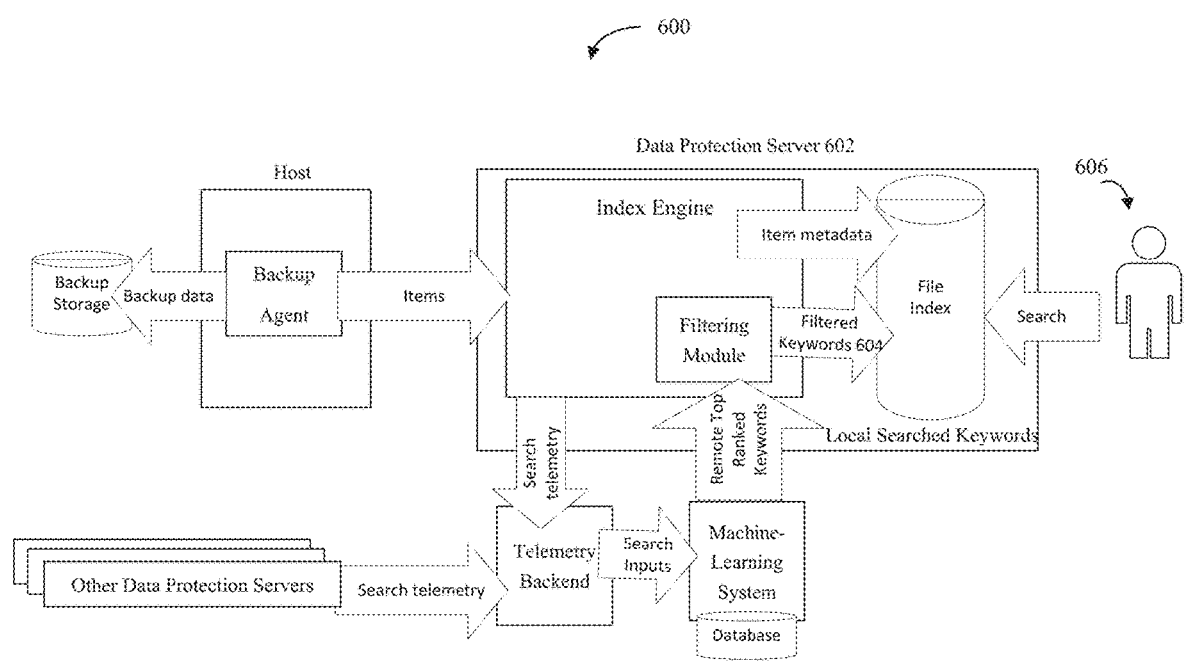
FIG. 6 is a block diagram illustrating another example operating environment for identifying keywords for indexing content and searching backups, according to one or more embodiments of the disclosure

A ranked list of globally searched keywords may be included with new installs of a data protection server, with the latest versions of these ranked lists included in upgrade packages, which can also be pushed directly to connected data protection servers, at a greater frequency than upgrades usually occur. For example, a software developer may publish upgrades to data protection appliance software every three months, but a data protection appliance can update the newest versions of the ranked list of globally searched keywords on a daily or a weekly basis. The appliance-specific list of locally searched keywords which are supplemented by keywords from clusters of similar keywords is pushed directly to the applicable data protection appliance for connected systems. FIG. 6 depicts an example operating environment 600, which includes a data protection server 602 that uses all lists, the local list of frequently identified keywords, the list of locally searched keywords, and the list of globally searched keywords from the backend, as filters for granular indexed content, and the resulting filtered keywords 604 are pushed into a file index, which is leveraged for search by end users 606.

For example, a Microsoft Word document with 10,000 words is scanned, and content-scraping identifies 2,000 unique keywords. The locally-generated top ranked list of frequently identified keywords includes 100 keywords. The success-adjusted ranked list of locally searched keywords includes 10 keywords. The top ranked list of globally searched keywords includes 300 keywords. The clusters of similar keywords includes 50 keywords which are similar to the keywords in the other lists.

After accounting for duplicates, these filtering keywords include a total of 350 keywords. Of the 2,000 unique words in the Microsoft Word document, 100 keywords (5%) match the filtering keywords, so the system indexes 100 keywords for the document, which is a 95% savings compared to indexing all potential keywords for the document.

Intelligent full content filtering is based on ranked lists of keywords from multiple sources, which include locally-identified frequently identified keywords, locally searched keywords, the sanitized and aggregated ranked list of globally searched keywords, and similar keywords based on clusters of keywords which are similar to keywords in the other lists. A machine-learning algorithm ranks keywords, leveraging multiple data points based on weightings, which incorporates keyword success in searches and restores as well as keyword frequency and use. The machine-learning model continuously learns and improves keyword weightings and rankings over time, and provides a capability to tweak the machine-learning model to balance search flexibility against storage usage.

Keyword search of granular files and/or items inside backups provides powerful tools for users. Supporting this is challenging due to the vast amount of full text content that is produced, most of which is never needed or used, which can make the disk space requirements prohibitive. This disclosed system solves the problem of providing full backup content indexes of "useful" data, while minimizing disk space usage. This disclosed system demonstrates how aggregating ranked lists of locally and globally searched keywords can support this powerful feature while limiting the impact on customer resources, such as storage, CPU, and memory, via filtering.

Figure 7:
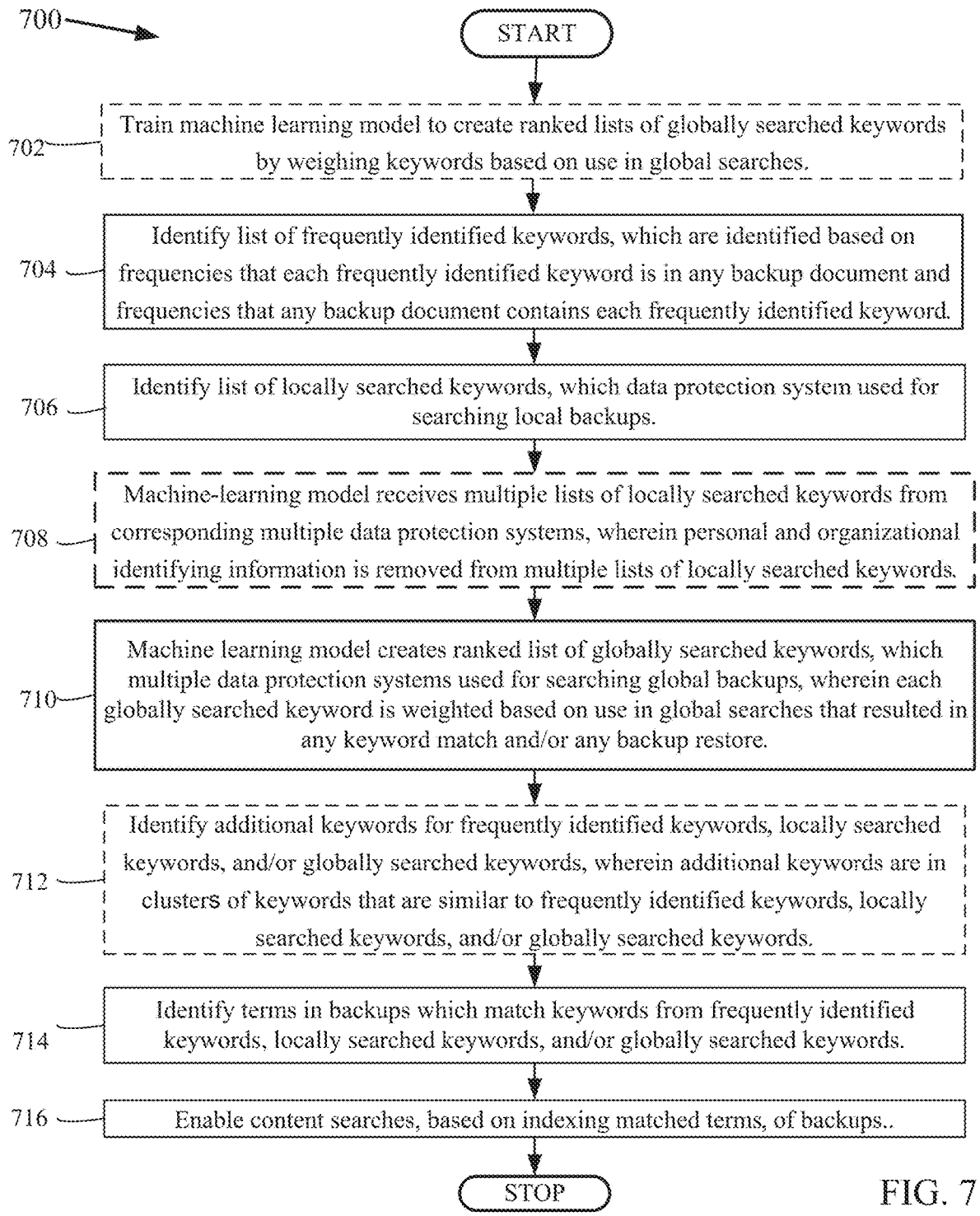
FIG. 7 is a block diagram illustrating an example method for identifying keywords for indexing content and searching backups, according to one or more embodiments of the disclosure.

FIG. 7 is a flowchart that illustrates a computer-implemented method for identifying keywords for indexing content and searching backups, under an embodiment. The flowchart 700 illustrates method acts illustrated as flowchart blocks for certain steps involving the component(s) of the example operating environment 600 of FIG. 6.

A machine learning model is optionally trained to create ranked lists of globally searched keywords by weighing factors of keywords based on use in global searches, block 702. The system can enable a system administrator to train a machine-learning model to create ranked lists of globally searched keywords. For example, and without limitation, this can include a system administrator training a machine learning model to create ranked lists of globally searched keywords by combining many data protection appliances' locally searched keywords, weighing factors of the keywords based on matching keywords in some backups and restoring some of the backups.

A machine learning model can be artificial intelligence software that enables a computer to improve at a task without being explicitly programmed. A ranked list can be a number of connected items or names written consecutively and positioned within a hierarchy. A globally searched keyword can be an informative term from multiple data protection systems that is used to investigate whether documents that are internal to the systems includes the informative term.

A factor can be a circumstance, fact, or influence that contributes to a result or outcome. A keyword can be an informative term used in an information retrieval system to indicate the content of a document. A global search can be an investigation by multiple data protection systems whether documents that are internal to the systems include an informative term.

After the training of a machine-learning model to create a ranked list of globally searched keywords, a list of frequently identified keywords is identified, which are identified based on frequencies that each frequently identified keyword is in any backup document and frequencies that any backup document contains each frequently identified keyword, block 704. The system identifies previous backups' keywords that are frequently identified. By way of example and without limitation, this can include Acme Corporation's data protection appliance using the term-frequency/inverse document frequency formula to identify 100 keywords that were indexed for the previous backups.

A list can be a number of connected items or names written consecutively. A frequently identified keyword can be an informative term which is often used in an information retrieval system to indicate the content of a document. A frequency can be the rate at which something occurs or is repeated in a given sample. A backup document can be an extra copy of an electronic matter from a computer, which provides information.

The frequencies that each frequently identified keyword is in any backup document may be based on a term frequency determined by a total number of instances that each frequently identified keyword is identified in the backup document relative to a total number of keywords in the backup document. For example, the term "business plan" constitutes one-half of one percent of the terms in a document. A term frequency can be the number of instances of a word or phrase appearing in a document, divided by the total number of words or phrases in the document. A total number can be a count of the whole or complete amount. An instance can be a single occurrence of an object.

The frequencies that any backup document contains each frequently identified keyword may be based on an inverse document frequency determined by a total number of documents in a corpus of backup documents relative to a total number of backup documents in the corpus of backup documents which contain each frequently identified keyword. For example, ten percent of the documents in a directory include the term "business plan." An inverse document frequency can be the number of electronic matters that are in a corpus relative to the number of electronic matters that are in the corpus and that also contain a term. A document can be an electronic matter which provides information. A corpus can be an entire collection of written texts.

Identifying frequently identified keywords may be based on a product of the term frequency and the inverse document frequency. For example, multiplying the one-half of one percent for the term frequency of the term "business plan" by the logarithm base 10 of the ten percent of the documents that include the term "business plan" results in 0.5 percent multiplied by negative 1, which produces negative 0.5 percent. A product can be a quantity obtained by multiplying quantities together, or from an analogous algebraic operation.

In addition to identifying a list of frequently identified keywords, a list of locally searched keywords is identified, which a data protection system used for searching local backups, block 706. Each locally searched keyword may be ranked based on use in searches that resulted in any keyword match and/or any backup restore. The system identifies the locally searched keywords. In embodiments, this can include Acme's appliance identifying 10 keywords which were used to search and match keywords, 4 of which were used to restore local backups.

A locally searched keyword can be an informative term from a data protection system that is used to investigate whether a document that is internal to the system includes the informative term. A data protection system can be a combination of hardware and/or software that safeguards information from damage, corruption or loss and ensures that the information is readily available to users through backup and recovery. A local backup can be an extra copy of digital information from a data protection system.

A search can be the investigating process which leads to the systematic retrieval of information. A keyword match can be a pair of equivalent informative terms used in an information retrieval system to indicate the content of a document. A backup restore can be the retrieval of an extra copy of digital information to reinstate something to its previous condition.

Following the identification of a list of locally searched keywords, a machine-learning model optionally receives multiple lists of locally searched keywords from corresponding multiple data protection systems, wherein personal and organizational identifying information is removed from the multiple lists of locally searched keywords, block 708. The system collects many system's lists of locally searched keywords to create an aggregate list of globally searched keywords. For example, and without limitation, this can include a machine-learning model receiving Acme's list of locally searched keywords and many other customer's lists of locally searched keywords. Personal and organizational identifying information can be data that describes, establishes, or indicates specifically who someone is or what something is.

Having identified and/or received one or more lists of locally searched keywords, a machine learning model creates a ranked list of globally searched keywords, which multiple data protection systems used for searching global backups, wherein each globally searched keyword is weighted based on use in global searches that resulted in at least one of any keyword match or any backup restore, block 710. The system uses machine-learning to convert multiple appliance's lists of locally searched keywords into a list of globally searched keywords. By way of example and without limitation, this can include a machine-learning model creating a list of 300 globally searched keywords, which multiple appliances used for searching keywords in global backups and restoring some of the global backups. A global backup can be an extra copy of digital information aggregated from multiple data protection systems.

Personal and organizational identifying information may be removed from globally searched keywords. For example, the Acme appliance removes the proprietary names of Acme products and the personal names of Acme employees before sending Acme's locally searched keywords to the backend for the data protection appliances, where an individual appliance's locally searched keywords becomes part of the aggregated appliances' globally searched keywords.

After creating a ranked list of globally searched keywords, additional keywords are optionally identified for the frequently identified keywords, the locally searched keywords, and/or the globally searched keyword, wherein the additional keywords are in clusters of keywords that are similar to the frequently identified keywords, the locally searched keywords, and/or the globally searched keywords, block 712. The system supplements the lists of keywords with similar keywords that are clustered with the listed keywords. In embodiments this can include the machine-learning model determining that since an Acme system user submitted a search for the word "marketing," and "marketing" is clustered with similar terms "support," "sales," and "HR," the machine-learning model can assign a weight for indexing all of these similar terms for subsequent searches. A cluster can be a group of similar things positioned closely together.

Following the creation of a ranked list of globally searched keywords, terms are identified in backups which match keywords from any of the frequently identified keywords, the locally searched keywords, or the globally searched keywords, block 714. The system uses the lists of optimal keywords as filters to identify which terms in current documents should be indexed for future searches. For example and without limitations, this can include Acme's appliance identifying 2,000 unique words and 10,000 words in a Word document, and then comparing the 2,000 unique words against the list of 350 combined keywords, which results in a match of 100 keywords. A term can be a word or a phrase. A backup can be an extra copy of digital information from a computer.

Having matched terms from the backups with the listed keywords, content searches, based on indexing the matched terms, are enabled of the backups, block 716. The system indexes the optimal keywords, which enables the searching of backups. By way of example and without limitation, this can include Acme's appliance indexing the backup terms that matched the 100 keywords, thereby enabling content searches of the current and future backups. A content search can be process of investigating whether specific digital information is present in electronic media, which can lead to the systematic retrieval of the information. A matched term can be a pair of equivalent informative words or phrases used in an information retrieval system to indicate the content of a document.

Although FIG. 7 depicts the blocks 702-716 occurring in a specific order, the blocks 702-716 may occur in other orders. In other implementations, each of the blocks 702-716 may also be executed concurrently and/or in combination with other blocks and/or some blocks may be divided into a different set of blocks.

Exemplary Computing System

Figure 8:
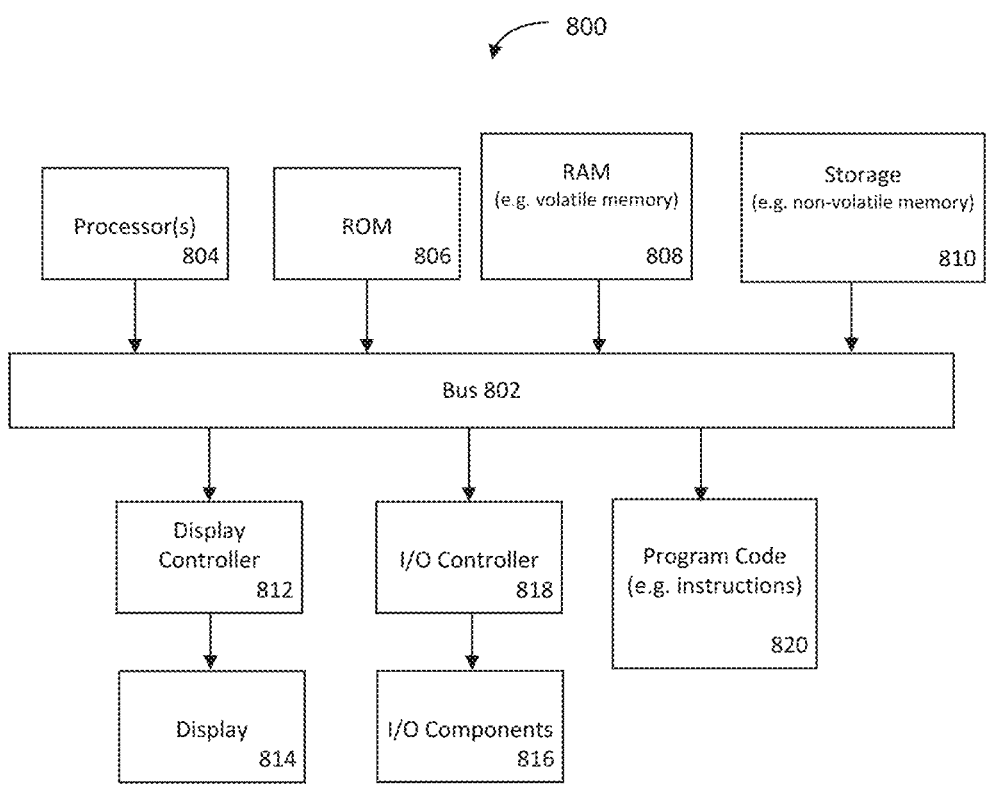
FIG. 8 is a block diagram illustrating an example computing system for identifying keywords for indexing content and searching backups, according to one or more embodiments of the disclosure.

FIG. 8 shows a block diagram of an example of a computing system that may be used in conjunction with one or more embodiments of the disclosure. For example, computing system 800 (or system, or server, or computing device, or device) may represent any of the devices or systems described herein that perform any of the processes, operations, or methods of the disclosure. Note that while the computing system 800 illustrates various components, it is not intended to represent any particular architecture or manner of interconnecting the components as such details are not germane to the present disclosure. It can also be appreciated that other types of systems that have fewer or more components than shown may also be used with the present disclosure.

As shown, the computing system 800 may include a bus 802 which may be coupled to a processor 804, ROM (Read Only Memory) 806, RAM (Random Access Memory or volatile memory) 808, and storage (or non-volatile memory) 810. The processor(s) 804 may retrieve stored instructions from one or more of the memories 806, 808, and 810 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 804 may perform operations in an on-demand or "cloud computing" environment or as a service, such as within a "software as a service" (SaaS) implementation. Accordingly, the performance of operations may be distributed among the one or more processors 804, whether residing only within a single machine or deployed across a number of machines. For example, the one or more processors 804 may be located in a single geographic location (such as within a home environment, an office environment, or a server farm), or may be distributed across a number of geographic locations.

The RAM 808 may be implemented as, for example, dynamic RAM (DRAM), or other types of memory that require power continually in order to refresh or maintain the data in the memory. Storage 810 may include, for example, magnetic, semiconductor, tape, optical, removable, non-removable, and other types of storage that maintain data even after power is removed from the system. It should be appreciated that storage 810 may be remote from the system, such as accessible via a network.

A display controller 812 may be coupled to the bus 802 in order to receive display data to be displayed on a display device 814, which can display any one of the user interface features or embodiments described herein and may be a local or a remote display device. The computing system 800 may also include one or more input/output (I/O) components 816 including mice, keyboards, touch screen, network interfaces, printers, speakers, and other devices. Typically, the input/output components 816 are coupled to the system through an input/output controller 818.

Program code 820 may represent any of the instructions, applications, software, libraries, toolkits, modules, components, engines, units, functions, logic, etc. as described herein. Program code 820 may reside, completely or at least partially, within the memories described herein (such as non-transitory computer-readable media), or within a processor during execution thereof by the computing system. Program code 820 may include both machine code, such as produced by a compiler, and files containing higher-level or intermediate code that may be executed by a computing system or other data processing apparatus (or machine) using an interpreter. In addition, program code 820 may be implemented as software, firmware, or functional circuitry within the computing system, or as combinations thereof. Program code 820 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (such as any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In addition, the use of the term "or" indicates an inclusive or (such as "and/or") unless otherwise specified. For example, the phrase "at least one of x, y, or z" means any one of x, y, and z, as well as any combination thereof. In addition, the term "based on" is used to describe one or more factors that affect a determination.

These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure are apparent to those skilled in the art from consideration of the specification and practice of the invention disclosed herein. It is intended that the specification and examples be considered as examples only, with a true scope and spirit of the embodiments being indicated by the claims.

What is claimed is:

1. A system for identifying keywords for indexing content and searching backups, comprising:
   one or more processors; and
   a non-transitory computer readable medium storing a plurality of instructions, which when executed, cause the one or more processors to:
      identify a list of frequently identified keywords, which are identified based on frequencies that each frequently identified keyword is in any backup document and frequencies that any backup document contains each frequently identified keyword;
      identify a list of locally searched keywords, which a data protection system used for searching local backups;
      create, by a machine learning model, a ranked list of globally searched keywords, which multiple data protection systems used for searching global backups, wherein each globally searched keyword is weighted based on use in global searches that resulted in at least one of any keyword match or any backup restore;
      identify terms from backups which match keywords from any of the frequently identified keywords, the locally searched keywords, or the globally searched keywords; and
      enable content searches, based on indexing the matched terms, of the backups.

2. The system of claim 1, wherein the plurality of instructions further causes the processor to train the machine learning model to create ranked lists of globally searched keywords by weighing keywords based on use in global searches.

3. The system of claim 1, wherein the frequencies that each frequently identified keyword is in any backup document are based on a term frequency determined by a total number of instances that each frequently identified keyword is identified in the backup document relative to a total number of keywords in the backup document.

4. The system of claim 3, wherein the frequencies that any backup document contains each frequently identified keyword are based on an inverse document frequency determined by a total number of documents in a corpus of backup documents relative to a total number of backup documents in the corpus of backup documents which contain each frequently identified keyword.

5. The system of claim 4, wherein identifying frequently identified keywords is based on a product of the term frequency and the inverse document frequency, and the list of locally searched keywords are ranked based on use in local searches that resulted in at least one of any keyword match or any backup restore.

6. The system of claim 1 wherein the plurality of instructions further causes the processor to receive, by the machine-learning model, multiple lists of locally searched keywords from corresponding multiple data protection systems, wherein personal and organizational identifying information is removed from the multiple lists of locally searched keywords.

7. The system of claim 1, wherein the plurality of instructions further causes the processor to identify additional keywords for at least one of the frequently identified keywords, the locally searched keywords, or the globally searched keyword, wherein the additional keywords are in clusters of keywords that are similar to at least one of the frequently identified keywords, the locally searched of keywords, or the globally searched keywords.

8. A computer program product comprising a non-transitory computer-readable medium having a computer-readable program code embodied therein to be executed by one or more processors, the program code including instructions to:
   identify a list of frequently identified keywords, which are identified based on frequencies that each frequently identified keyword is in any backup document and frequencies that any backup document contains each frequently identified keyword;
   identify a list of locally searched keywords, which a data protection system used for searching local backups;
   create, by a machine learning model, a ranked list of globally searched keywords, which multiple data protection systems used for searching global backups, wherein each globally searched keyword is weighted based on use in global searches that resulted in at least one of any keyword match or any backup restore;
   identify terms from backups which match keywords from any of the frequently identified keywords, the locally searched keywords, or the globally searched keywords; and enable content searches, based on indexing the matched terms, of the backups.

9. The computer program product of claim 8, wherein the program code includes further instructions to train the machine learning model to create ranked lists of globally searched keywords by weighing keywords based on use in global searches.

10. The computer program product of claim 8, wherein the frequencies that each frequently identified keyword is in any backup document are based on a term frequency determined by a total number of instances that each frequently identified keyword is identified in the backup document relative to a total number of keywords in the backup document.

11. The computer program product of claim 10, wherein the frequencies that any backup document contains each frequently identified keyword are based on an inverse document frequency determined by a total number of documents in a corpus of backup documents relative to a total number of backup documents in the corpus of backup documents which contain each frequently identified keyword.

12. The computer program product of claim 11, wherein identifying frequently identified keywords is based on a product of the term frequency and the inverse document frequency, and the list of locally searched keywords are ranked based on use in local searches that resulted in at least one of any keyword match or any backup restore.

13. The computer program product of claim 8, wherein the program code includes further instructions to receive, by the machine-learning model, multiple lists of locally searched keywords from corresponding multiple data protection systems, wherein personal and organizational identifying information is removed from the multiple lists of locally searched keywords.

14. The computer program product of claim 8, wherein the program code includes further instructions to identify additional keywords for at least one of the frequently identified keywords, the locally searched keywords, or the globally searched keyword, wherein the additional keywords are in clusters of keywords that are similar to at least one of the frequently identified keywords, the locally searched of keywords, or the globally searched keywords.

15. A computer-implemented method for identifying keywords for indexing content and searching backups, comprising:
    identifying a list of frequently identified keywords, which are identified based on frequencies that each frequently identified keyword is in any backup document and frequencies that any backup document contains each frequently identified keyword;
    identifying a list of locally searched keywords, which a data protection system used for searching local backups;
    creating, by a machine learning model, a ranked list of globally searched keywords, which multiple data protection systems used for searching global backups, wherein each globally searched keyword is weighted based on use in global searches that resulted in at least one of any keyword match or any backup restore;
    identifying terms from backups which match keywords from any of the frequently identified keywords, the locally searched keywords, or the globally searched keywords; and
    enabling content searches, based on indexing the matched terms, of the backups.

16. The computer-implemented method of claim 15, wherein the computer-implemented method further comprises training the machine learning model to create ranked lists of globally searched keywords by weighing keywords based on use in global searches.

17. The computer-implemented method of claim 15, wherein frequencies that each frequently identified keyword is in any backup document are based on a term frequency determined by a total number of instances that each frequently identified keyword is identified in the backup document relative to a total number of keywords in the backup document.

18. The computer-implemented method of claim 16, wherein the frequencies that any backup document contains each frequently identified keyword are based on an inverse document frequency determined by a total number of documents in a corpus of backup documents relative to a total number of backup documents in the corpus of backup documents which contain each frequently identified keyword, wherein identifying frequently identified keywords is based on a product of the term frequency and the inverse document frequency, and the list of locally searched keywords are ranked based on use in local searches that resulted in at least one of any keyword match or any backup restore.

19. The computer-implemented method of claim 15, wherein the computer-implemented method further comprises receiving, by the machine-learning model, multiple lists of locally searched keywords from corresponding multiple data protection systems, wherein personal and organizational identifying information is removed from the multiple lists of locally searched keywords.

20. The computer-implemented method of claim 15, wherein the computer-implemented method further comprises identifying additional keywords for at least one of the frequently identified keywords, the locally searched keywords, or the globally searched keyword, wherein the additional keywords are in clusters of keywords that are similar to at least one of the frequently identified keywords, the locally searched of keywords, or the globally searched keywords.

* * * * *